July 19, 1938.  H. D. GEYER  2,124,059
CLUTCH DISK
Filed May 28, 1937

Inventor
Harvey D. Geyer
By Blackmore, Spencer & Flint
Attorneys

Patented July 19, 1938

2,124,059

UNITED STATES PATENT OFFICE 2,124,059

CLUTCH DISK

Harvey D. Geyer, Dayton, Ohio, assignor to General Motors Corporation, Detroit, Mich., a corporation of Delaware Application May 28, 1937, Serial No. 145,388

1 Claim. (Cl. 192—52)

This invention relates to friction clutches and particularly to such clutches as are used on vehicles to couple the engine shaft with the input shaft of the change speed transmission.

An object of the invention is to improve the operation of clutch engagement. More specifically the inventive idea is to prevent clutch chatter and to provide for a smooth and gradual engagement of the driving and driven members.

Other objects include simplicity of construction and economy in manufacture.

Still other objects and advantages will be understood from the following description.

Figure 1:
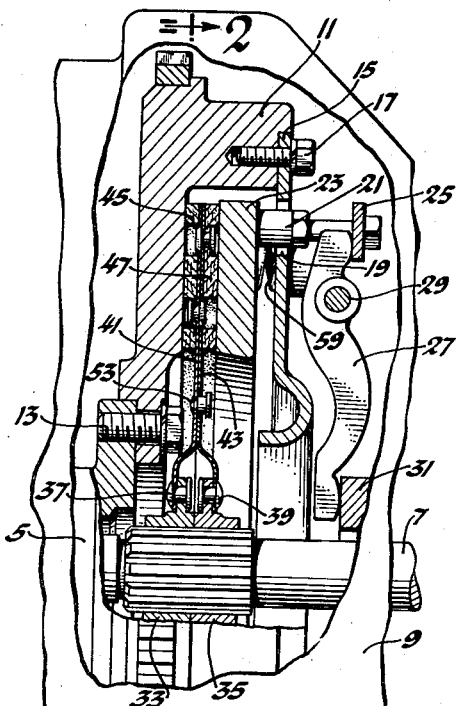
Figure 1 is a side elevation of the clutch housing, the housing being broken away and parts of the clutch shown in section.

Referring by reference characters to the drawing, numeral 5 will be seen to represent the end of the engine shaft and 7 to designate the input shaft of a change speed unit (not shown). The housing 9 encloses the mechanism by which shaft 5 may releasably drive shaft 7. Within the housing is a flywheel 11 secured to the engine shaft by fastening means 13. A clutch cover 15 is secured to the flywheel by fastening means 17. Through holes 19 in this cover there project lugs 21 extending from a pressure plate 23. There are shown bridges 25 associated with the projections 21, said bridges being engaged by fingers, one of which is mounted on a cover pivot 29. The inner ends of the fingers are engaged by a throwout device 31 movable to the left to pull the pressure plate away from the flywheel.

Figure 3:
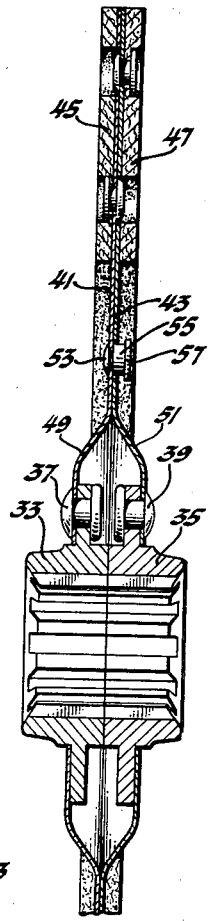
Figure 3 is a section on line 3—3 of Figure 2.

The invention is more particularly concerned with the driven member of the clutch. The shaft 7 has splined thereon a two part hub, the parts being marked 33 and 35. Rivets 37 and 39 secure plates 41 and 43 to the hubs. Plate 41 has riveted or otherwise secured thereto a friction facing 45 while plate 43 is similarly provided with a facing 47. Suitable holes are formed in each facing to afford access to the rivets which serve to secure the other facing to its plate. When the clutch is engaged the facing 45 engages the flywheel face and facing 47 engages the pressure plate 23. This engagement is resiliently effected by means of springs 59 engaging the pressure plate and in abutment with the cover plate. When so engaged the greater part of the two plates are in contact as shown in Figure 3, as also are the splined hubs 33 and 35. Since the plates are in contact and since their points of attachment to the hubs are axially spaced, each plate is formed with a circumferentially bent region as at 49 and 51. When the clutch is released the plates are free to separate as in Figure 4. When so separated the hubs 33 and 35 may also separate. There may be provided rivets 53 carried by one of the plates. The rivets have enlarged parts 55 with heads 57. The drawing shows plate 41 equipped with such rivets 53 arranged circumferentially. Plate 43 has openings surrounding the parts 55 of the rivets, the heads 57 limiting the axial movement and preventing the separation of the two parts of the driven member. The holes in plate 43 are enough larger than parts 55 to provide relative movement, including relative rotary movement, between the plates.

Figure 4:
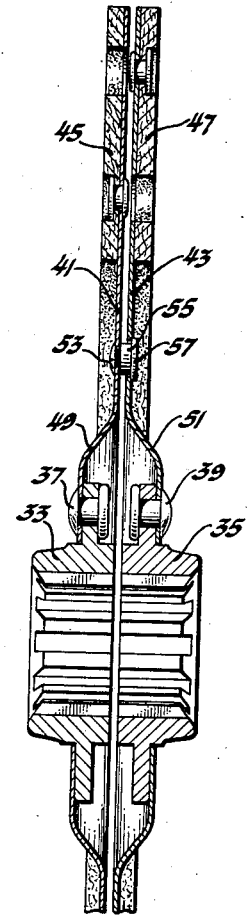
Figure 4 is a similar section with the parts displaced from the position they occupy in Figure 3.
Figure 2:
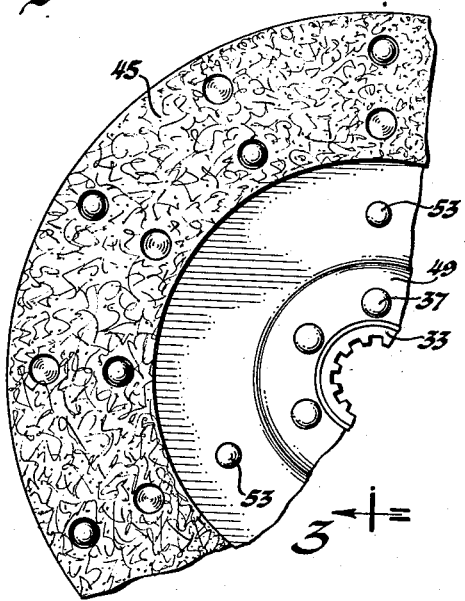
Figure 2 is a detail of the driven member as seen from line 2—2 of Figure 1.

When the clutch is released the parts occupy the positions shown in Figure 4. When the clutch is to be engaged, the pressure plate is allowed to move toward the flywheel under the influence of springs 59. As the parts approach the positions shown by Figure 3 where the hubs and the plates themselves are in contact, relative movement between the two hubs and the shaft and the clearance around the rivets 53 permit slight relative movement between the two plates as the friction facings are gripped between the flywheel face and the pressure plate. This relative movement occurs because facing 45 of plate 41 engages the flywheel and facing 47 of plate 43 engages the pressure plate. The flywheel and the pressure plate rotate together but one of the plates is likely to be engaged before the other and the limited movement between the plates provides gradual clutching action and eliminates chatter.

I claim:

In a clutch, spaced driving members, a driven shaft, spaced hubs having splined connection with said driven shaft, said splined connection affording limited relative rotation between said hubs, driven clutch plates riveted to said hubs and facings on the remote faces of said driven plates, one to engage one of the driving members and the other to engage the other driving member, together with means connecting said driven plates to provide for limited relative movements therebetween and to prevent axial separation thereof.

HARVEY D. GEYER.